United States Patent [19]
Burnett

[11] 4,101,011
[45] Jul. 18, 1978

[54] DRUM BRAKE ADJUSTER

[75] Inventor: Richard T. Burnett, South Bend, Ind.

[73] Assignee: The Bendix Corporation, Southfield, Mich.

[21] Appl. No.: 791,667

[22] Filed: Apr. 28, 1977

[51] Int. Cl.² ............................................. F16D 65/56
[52] U.S. Cl. ..................... 188/79.5 GT; 188/196 BA; 188/216
[58] Field of Search ....................... 188/79.5 B, 79.5 P, 188/79.5 GE, 79.5 GT, 79.5 GC, 196 BA

[56] References Cited

U.S. PATENT DOCUMENTS

| 2,570,398 | 10/1951 | Smith | 188/79.5 B |
| 4,015,693 | 4/1977 | Hayashida et al. | 188/79.5 P |

FOREIGN PATENT DOCUMENTS

| 1,159,219 | 12/1963 | Fed. Rep. of Germany | 188/79.5 P |
| 1,220,992 | 1/1971 | United Kingdom | 188/79.5 P |

*Primary Examiner*—Duane A. Reger
*Attorney, Agent, or Firm*—Paul David Schoenle; Ken C. Decker

[57] ABSTRACT

A drum brake adjustment mechanism is provided to maintain a running clearance between a pair of brake shoes and a rotatable member. The adjustment mechanism includes an extendible member which is disposed between the pair of brake shoes and engageable with a pawl which is pivotally mounted on one of the brake shoes. A resilient member encircles the extendible member and engages the other brake shoe and the pawl to bias the pair of brake shoes into engagement with a hydraulic actuator which is operable to urge the pair of brake shoes into engagement with the rotatable member. Moreover, the resilient member cooperates with the pawl to extend the extensible member when the clearance between the pair of brake shoes and the rotatable member is greater than the running clearance.

8 Claims, 3 Drawing Figures

DRUM BRAKE ADJUSTER

BACKGROUND OF THE INVENTION

A drum brake adjuster disposes a pair of brake shoes in close proximity to a drum so that upon a brake application the shoes need only travel through a running clearance to effectuate braking. Consequently, a motor vehicle operator senses braking when a brake pedal moves through a relatively short stroke rather than a full stroke which would be required as the shoes wear and the clearance with the drum increases.

Drum brake adjusters, such as illustrated in U.S. Pat. No. 3,706,360, utilize an extendible member and a pawl to extend the extendible member when the clearance between the brake shoes and the drum is above a predetermined running clearance. As the prior art provides a multiplicity of springs to provide for brake shoe retraction and cooperation between the pawl and extendible member, such adjusters are costly and require lengthy assembly procedures. Consequently, it is believed to be desirable to provide a simple drum brake adjuster wherein the number of springs is reduced.

SUMMARY OF THE INVENTION

The present invention relates to a drum brake automatic adjuster for positioning a pair of brake shoes in running clearance with a rotatable member. The automatic adjuster comprises an extendible member which is engageable with the pair of brake shoes, a pawl cooperating with the extendible member to extend the same and a resilient member cooperating with the pawl and extendible member to bias the pair of brake shoes into engagement with a hydraulic actuator and cooperating with the pawl to provide for the extension of the extendible member.

In particular, the pawl is pivotally mounted to one of the brake shoes and includes a first arm cooperating with a ratchet wheel on the extendible member such that rotation of the first arm in one direction increments the first arm to successive teeth on the ratchet wheel and rotation of the first arm in the other direction rotates the ratchet wheel thereby extending the extendible member. The resilient member releasably engages the other brake shoe and coils around the extendible member between the other brake shoe and the pawl to conserve space. The resilient member also releasably engages the pawl to bias a second arm into abutment with a shoulder on the extendible member. The resilient member engages the pawl between the abutment with the shoulder and the pivotal mounting with the one brake shoe so that the resilient member creates a moment for the pawl about the abutment with the shoulder in order to bias the one brake shoe via the pivotal mounting into engagement with the hydraulic actuator.

Moreover, the second arm remains in abutment with the extendible member shoulder in view of the engagement between the pawl and resilient member. Consequently, radial expansion of the pair of brake shoes results in the extendible member moving with the other brake shoe and the first arm pivots relative to the second arm to increment the second arm to a successive tooth on the ratchet wheel. Upon radial contraction of the pair of brake shoes, the shoulder abuts the second arm to pivot the pawl thereby causing the second arm to rotate the ratchet wheel to extend the extendible member.

DETAILED DESCRIPTION

Figure 1:
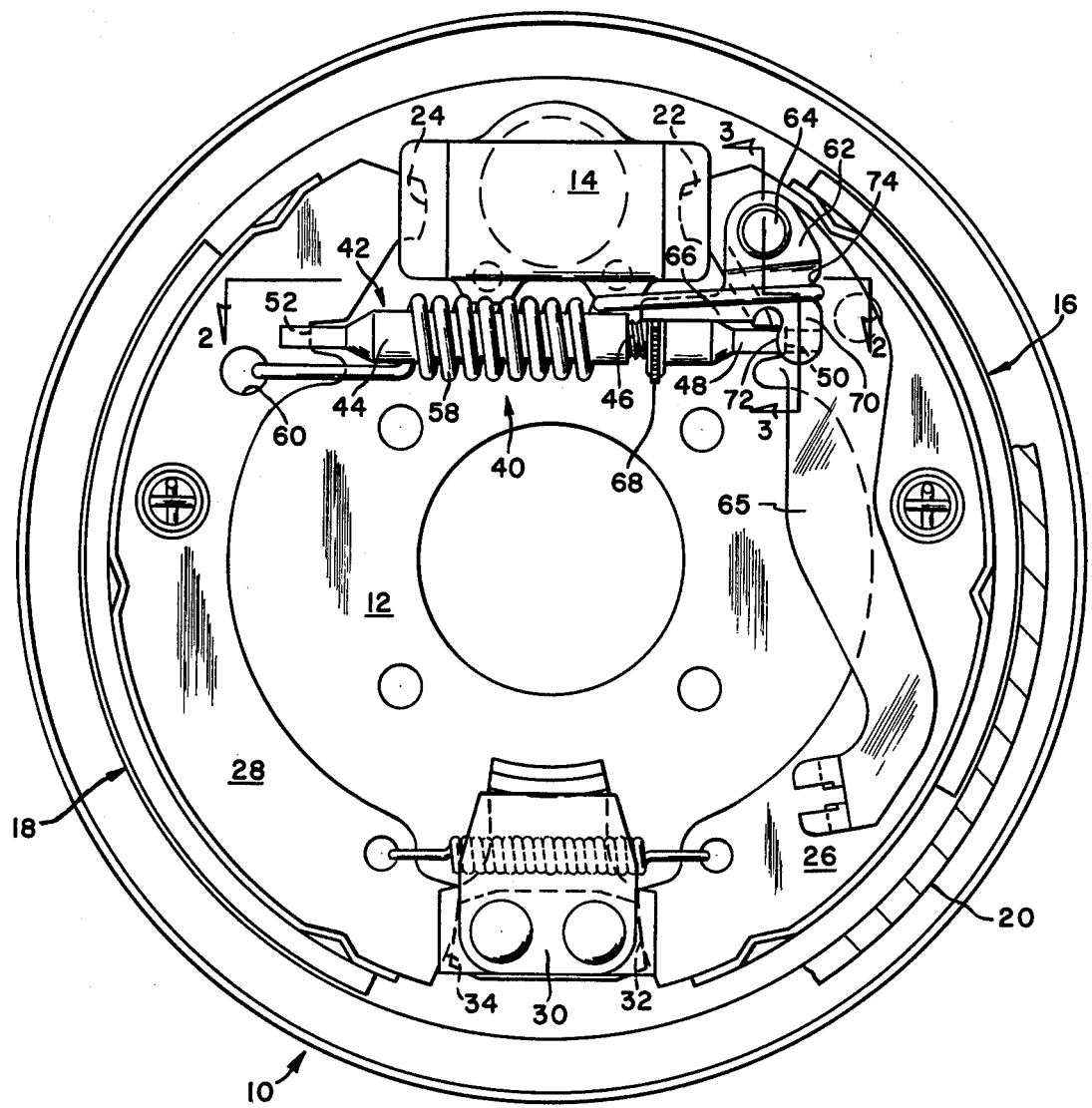
FIG. 1 is a front view of a drum brake assembly including the adjuster of the present invention.
Figure 2:
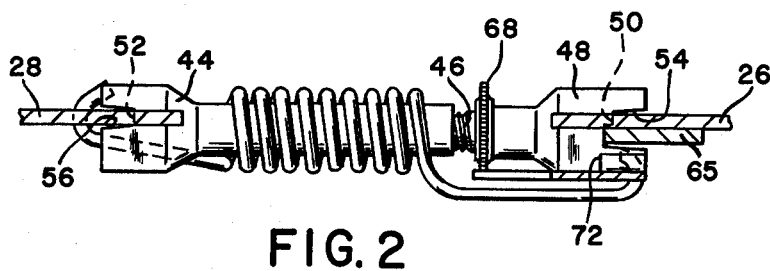
FIG. 2 is a cross-sectional view taken along line 2—2 of FIG. 1.
Figure 3:
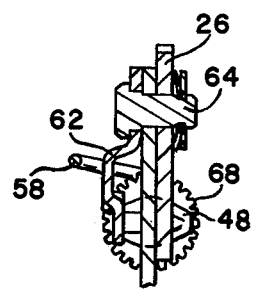
FIG. 3 is a cross-sectional view taken along line 3—3 of FIG. 1.

A drum brake assembly 10 is illustrated in FIG. 1 and is associated with a wheel assembly (not shown) in order to provide braking for the wheel assembly. A backing plate 12, carried by a nonrotating portion of the wheel assembly, supports a hydraulic actuator 14, which is operable to radially expand a pair of brake shoes 16 and 18. Upon expansion, the brake shoes are engageable with a rotatable member 20, associated with a rotating portion of the wheel assembly, in order to retard the rotation thereof.

The hydraulic actuator 14 is provided with grooves 22 and 24 for receiving brake shoe webs 26 and 28, respectively, while an anchor plate 30 includes grooves 32 and 34 for receiving brake shoe webs 26 and 28 opposite the hydraulic actuator 14.

In accordance with the invention, an automatic brake adjuster 40 is disposed between the pair of brake shoes near the hydraulic actuator 14. The brake adjuster 40 includes an extendible member 42 comprising an elongated nut 44, a stem 46 threadably engaging the nut 44 and a socket 48 slidably receiving a portion of the stem 46. The extendible member 42 is mounted in recesses 50 and 52 on respective brake shoe webs 26 and 28 with slots 54 and 56 on the extendible member 42 engaging the corresponding recesses. Moreover, the brake adjuster 40 includes a resilient member 58 releasably engaging brake shoe 18 via opening 60 and a pawl 62 pivotally mounted via pin 64 on the brake shoe 16. The pin 64 also pivotally mounts a parking brake lever 65.

The pawl 62 includes a first arm 66 which cooperatively engages a ratchet wheel 68 secured to the stem 46. Consequently, counterclockwise rotation of pawl 62, viewing FIG. 1, pivots arm 66 such that the ratchet wheel 68 is rotated via the engagement with the first arm 66 to rotate the stem 46 so that the extendible member 42 is extended or increased in length. Conversely, clockwise rotation of pawl 62, viewing FIG. 1, pivots arm 66 such that the arm 66 is indexed to a successive tooth on the ratchet wheel 68. The pawl 62 also includes a second arm 70 abutting a shoulder 72 on the socket 48 of the extendible member 42. This second arm is maintained in abutment with the shoulder 72 as a result of the resilient member 58 extending in tension from the opening 60 to a groove 74 on the pawl 62 which is disposed between the pivotal mounting with pin 64 and the abutment between the shoulder 72 and the second arm 70. Consequently, the resilient member 58 creates a moment for pawl 62 about pin 64 urging the second arm 70 into abutment with the shoulder 72 and a moment about shoulder 72 urging the pin 64 and brake shoe 16 into engagement with the hydraulic actuator 14.

MODE OF OPERATION

When the hydraulic actuator 14 is operated or pressurized to expand the brake shoes 16 and 18 into engagement with the rotatable member 20, a braking application is effected to retard the rotation of rotatable member 20. Radial movement of the brake shoes away from the hydraulic actuator separates the recess 52 from the recess 50 and the extendible member 42 is maintained in engagement with the recess 52 while separating from the recess 50, as a result of the cooperation between the resilient member 58, which is anchored at opening 60, and the pawl 62 during a braking application. When the brake shoes separate during braking, the resilient member 58 pivots the pawl 62 clockwise relative to the shoe 16 so that the second arm 70 remains in abutment with the shoulder 72 to maintain the extendible member 42 in engagement with the brake shoe 18. If the clearance between the brake shoes and the rotatable member is above a predetermined value, the pivoting of the pawl 62 will rotate the first arm 66 clockwise such that it will index to a successive tooth on the ratchet wheel 68.

When braking is terminated and the hydraulic actuator 14 is depressurized, the resilient member 58 biases the pawl 62 to pivot counterclockwise about the abutment with shoulder 72 thereby causing the brake shoe 16 to retract radially via the pivotal connection between the pawl 62 and the brake shoe 16 at pin 64. Moreover, the resilient member 58 biases the brake shoe 18 radially inwardly as the brake shoe 16 radially retracts with the depressurization of hydraulic actuator 14.

As noted earlier, when the clearance between the rotatable member and brake shoes is greater than a predetermined value, generally referred to as a running clearance, the pawl first arm 66 is indexed to a successive tooth on the star wheel 68 as the brake shoes are radially expanded during braking. Consequently, upon termination of braking the resilient member 58 biases the pawl 62 to pivot counterclockwise about shoulder 72, so that the first arm 66 also pivots counterclockwise thereby rotating the star wheel 68 and the attached stem 46 to extend the extendible member 42.

If the clearance between the brake shoes and the rotatable member is equal to or less than the predetermined value, the pawl first arm 66 will not be indexed to a successive tooth on the star wheel during a brake application so that adjustment of the brake shoes relative to the rotatable member will not occur.

Viewing FIG. 1, it is noted that the resilient member 58 comprises a spring having its coiled portion encircling the extendible member 42 between the pawl 62 and the brake shoe 18. This feature enables a compact assembly for the brake adjuster 40 in order to conserve space. Moreover, actuation of the praking brake lever 65 operates the automatic brake adjuster 40 to adjust the position of the brake shoes relative to the rotatable member.

Although the present invention is illustrated in conjunction with a drum brake adjuster, it is intended that all modifications, alterations and variations apparent to those skilled in the art are covered by the present invention as measured by the scope of the appended claims.

I claim:

1. An adjustment mechanism for a drum brake having a hydraulic actuator cooperating with a pair of brake shoes to urge the latter into engagement with a rotatable member for effectuating braking, said adjustment mechanism comprising:
   an extendible member engaging the pair of brake shoes, said extendible member being extendible to dispose the pair of brake shoes adjacent but slightly spaced from the rotatable member;
   a pawl pivotally mounted on one of the brake shoes, said pawl engaging said extendible member to provide for extension of the extendible member when the pawl pivots relative to the one brake shoe; and
   a resilient member extending from the other brake shoe to said pawl, said resilient member cooperating with the one brake shoe via the pivotal mounting with said pawl and the other brake shoe to bias the pair of brake shoes into engagement with the hydraulic actuator and said resilient member also cooperating with said pawl to pivot said pawl relative to the one brake shoe.

2. The adjustment mechanism of claim 1 in which said resilient member surrounds said extendible member between the other brake shoe and said pawl.

3. The adjustment mechanism of claim 1 in which said resilient member cooperates with said pawl to bias said extendible member away from the one brake shoe and into engagement with the other brake shoe when said pawl is pivoting relative to the one brake shoe.

4. The adjustment mechanism of claim 1 in which said resilient member cooperates with said pawl to maintain said extendible member in engagement with the other brake shoe when the pair of brake shoes expand to engage the rotatable member.

5. An adjustment mechanism for a drum brake having a hydraulic actuator cooperating with a pair of brake shoes to urge the latter into enagement with a rotatable member during braking, said adjustment mechanism comprising:
   an extendible member carried by the pair of brake shoes, said extendible member being extendible to dispose the pair of brake shoes adjacent but slightly spaced from the rotatable member;
   a resilient member cooperating with the pair of brake shoes to urge the latter into engagement with the hydraulic actuator; and
   a pawl pivotally mounted on one of the pair of brake shoes and cooperating with said resilient member to pivot relative to the one brake shoe, said pawl including a first arm engaging said extendible member and a second arm engaging said extendible member, said first arm cooperating with said extendible member to provide for extension of the latter and said second arm cooperating with said resilient member to move said extendible member away from the one brake shoe when said pawl pivots relative to the one brake shoe.

6. The adjustment mechanism of claim 5 in which said resilient member engages the other brake shoe and said pawl, said resilient member coiling around said extendible member and biasing the latter into engagement with the other brake shoe such that said extendible member moves with the other brake shoe when the pair of brake shoes are expanded into engagement with the rotatable member.

7. In a drum brake assembly having a hydraulic actuator for urging a pair of brake shoes into engagement with a rotatable member during braking and an extendible member for adjusting the clearance between the rotatable member and the pair of brake shoes, the improvement wherein a pawl pivots relative to one of said pair of brake shoes and engages the extendible member and a single resilient member cooperates with the pawl to provide for extension of the extendible member when the clearance between the pair of brake shoes and the rotatable member is above a predetermined value and said single resilient member also cooperates with said extendible member and said pawl to urge the pair of brake shoes into engagement with the hydraulic actuator.

8. In a drum brake assembly having a hydraulic actuator for urging a pair of brake shoes into engagement with a rotatable member during and an extendible member for adjusting the clearance between the rotatable member and the pair of brake shoes, the improvement wherein a pawl engages the extendible member and a single resilient member cooperates with the pawl to provide for extension of the extendible member when the clearance between the pair of brake shoes and the rotatable member is above a predetermined value, said single resilient member also cooperating with said extendible member and said pawl to urge the pair of brake shoes into engagement with the hydraulic actuator, said pawl being pivotally mounted on one of the brake shoes and being in abutment with the extendible member, said single resilient member engaging said pawl between the pivotal mounting and the abutment with the extendible member such that said pawl is pivoted about the abutment by said single resilient member to urge the one brake shoe into engagement with the hydraulic actuator via the pivotal mounting.

* * * * *